US012399500B1

(12) United States Patent
Enright et al.

(10) Patent No.: US 12,399,500 B1
(45) Date of Patent: Aug. 26, 2025

(54) ENDPOINT APPROACH AND LOCALIZATION FOR AUTONOMOUS ROBOTIC VEHICLES

(71) Applicant: Amazon Technologies, Inc., Seattle, WA (US)

(72) Inventors: John Enright, Bedford, MA (US); Gabriel Hebert, Wakefield, MA (US); Jaimie Marie-Michelle Carlson, Boston, MA (US); Sadat Ali Shaik, Downingtown, PA (US)

(73) Assignee: Amazon Technologies, Inc., Seattle, WA (US)

( * ) Notice: Subject to any disclaimer, the term of this patent is extended or adjusted under 35 U.S.C. 154(b) by 660 days.

(21) Appl. No.: 17/742,655

(22) Filed: May 12, 2022

(51) Int. Cl.
*G05D 1/00* (2024.01)

(52) U.S. Cl.
CPC .................................. *G05D 1/0234* (2013.01)

(58) Field of Classification Search
CPC ...... G05D 1/0234; G05D 1/247; G06Q 10/08; G06Q 10/047; G06Q 10/087
See application file for complete search history.

(56) References Cited

U.S. PATENT DOCUMENTS 9,152,149 B1 * 10/2015 Palamarchuk ..... G06K 7/10861
11,555,703 B2 * 1/2023 Syrstad ................ G01C 21/165
11,685,603 B1 * 6/2023 Serstad ................ B65G 1/1373 700/214
2002/0186884 A1 * 12/2002 Shaked ............ G06K 19/06037 382/183
2015/0371181 A1 * 12/2015 Palamarchuk ....... G06Q 10/087 701/28
2019/0332096 A1 * 10/2019 Porter .................. G06Q 10/087
2020/0017135 A1 * 1/2020 Carter ................ G08B 13/1436
2021/0045379 A1 * 2/2021 Grant .................. A01M 21/043
2021/0149416 A1 * 5/2021 Srivastava .............. B66F 9/063
2021/0294347 A1 * 9/2021 Chen ..................... G05D 1/0255
2021/0382494 A1 * 12/2021 Park ...................... G05D 1/0238
2021/0405646 A1 * 12/2021 Park ...................... G05D 1/0234
2022/0097238 A1 * 3/2022 Martel .................. G05B 19/124
2022/0266867 A1 * 8/2022 Ballard ............. B60W 60/0025
2023/0256959 A1 * 8/2023 Chiba .................. G05D 1/0274 340/932.2
2024/0370983 A1 * 11/2024 Schwartz .............. G06T 7/0002

OTHER PUBLICATIONS

M. Fiala, "Designing Highly Reliable Fiducial Markers," in IEEE Transactions on Pattern Analysis and Machine Intelligence, vol. 32, No. 7, pp. 1317-1324, Jul. 2010, doi: 10.1109/TPAMI.2009.146 (Year: 2010).*

* cited by examiner

*Primary Examiner* — Thomas Ingram
(74) *Attorney, Agent, or Firm* — Eversheds Sutherland (US) LLP

(57) ABSTRACT

Systems and methods are disclosed for improved endpoint approach and localization for autonomous mobile robots. In one embodiment, an example system may include a floor-mounted guide disposed on a floor of an environment, and an autonomous mobile robot having a camera and a controller. The autonomous mobile robot may be configured to autonomously navigate in the environment, where the controller can be configured to detect a first edge of the floor-mounted guide using the camera, detect a second edge of the floor-mounted guide using the camera, determine a location of the autonomous mobile robot based at least in part on the first edge and the second edge, and update a navigation path based at least in part on the location.

17 Claims, 10 Drawing Sheets

400 420 430 410 440 Distance to Fiducial 442 444 446 448 0

ENDPOINT APPROACH AND LOCALIZATION FOR AUTONOMOUS ROBOTIC VEHICLES

BACKGROUND

As users increasingly make online purchases, fulfilment of such purchases and other orders may become increasingly complicated. For example, a fulfillment center may have output of upwards of one million packages per day. With such demands, efficiency of logistics related to processing orders and packages may be important. Accordingly, improvements in various operations of order fulfillment, such as improvements to picking technology, sorting technology, packing technology, and so forth may be desired, such that throughput can be increased and sustainability can be improved.

Figure 1:
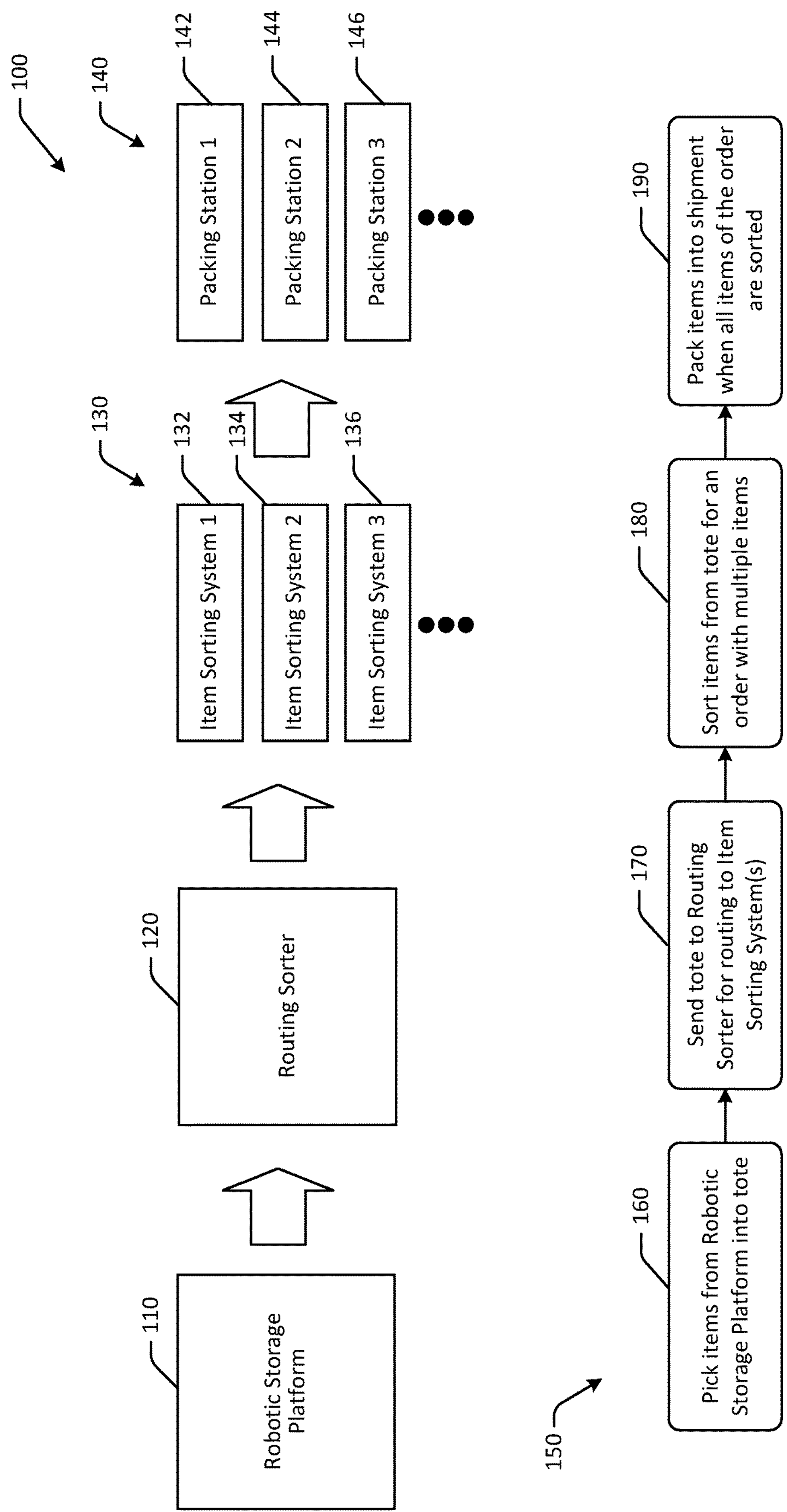
FIG. 1 is a hybrid schematic illustration of an example use case for improved endpoint approach and localization for autonomous mobile robots and an example process flow in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Fulfillment centers may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. As a result, transportation of products and/or shipping of packages in an order may be time consuming.

In some instances, orders for products may include multiple items. For example, a user may place an order for two or more products. In such instances, the products that are ordered may not be in the same location of the fulfillment center, or one of the products may take a longer time to obtain or pick than the others. As a result, packing of the order may be delayed until all of the items in the order are ready for packing. To improve the speed of processing orders, in certain instances, robots and other technology may be deployed, such that manual efforts can be redirected to other tasks. For example, robots may be used to assist with locating products in an order during a pick process. However, directing picked products to the appropriate packing station and/or location may form a bottleneck in the operation of the fulfillment center. For example, after products are picked, the products may be placed in a container, such as a tote or other container, and directed to sortation machines to direct the picked products to the appropriate packing location. Products in the same order may be directed to the same packing location for consolidation and subsequent packing. However, a tote or other container may include products that are to be sorted to multiple different packing locations, and the sortation process may be slowed by sheer volume of products that are to be processed and/or sorted. In addition, in some instances, items that are part of the same order may not all be in the same fulfillment center or other location. For example, a first product in an order of two items may be at a first fulfillment center, and a second product in the same order may be at a second fulfillment center. In such instances, instead of shipping the two items in the order separately, such as one from each fulfillment center, items may be transferred from one fulfillment center to another, and then aggregated with other items in the order and shipped together. Such fulfillment center-to-fulfillment center transfers of items may be processed similar to items that are to be shipped to consumers. For example, the items to be transferred may be picked, routed to a sortation machine, sorted into a particular container (e.g., a container designated for a particular fulfillment center, etc.), packed, and sent. In some instances, containers destined for other fulfillment centers may be infinite bottom containers, or containers that may be filled without consideration of a level of fullness or remaining capacity of the container. In such instances, capacity of the containers may be monitored externally (e.g., by a user manually, by a camera system automatically, using different sensors, etc.). Full containers may be removed from a sortation system and replaced with an empty container to continue aggregating items destined for a fulfillment center.

As items are placed into containers or packages for transport, sortation, etc., the packages may be placed in containers, such as foldable containers or carts, that are configured to hold a plurality of packages (or unpacked items, in other embodiments). For example, a foldable container may be filled with packages that are destined for another fulfillment center or other facility. The foldable containers may be used not only to store and transport packages or other items within a facility, but may also be used to transport the packages to another facility. For example, in some embodiments, the foldable containers may be filled with packages, and the filled foldable container may be loaded onto a truck and transported to another facility. At the destination facility, the entire foldable container may be unloaded from the truck and scanned to identify the contents of the foldable container, without having to empty the foldable container. This may allow for increased efficiency and reduced handling of individual packages, and may also provide the ability for foldable containers to be used across any number of facilities and/or workstations within a facility.

Such containers may be transported throughout facilities using one or more autonomous mobile robots (also referred to as autonomous robotic vehicles). For example, an autonomous mobile robot may be configured to position itself underneath a foldable container at a pickup location, lift the foldable container, and then autonomously navigate throughout a facility to a drop off location or a destination, and place the foldable container at the drop off location. To autonomously navigate through an environment, the autonomous mobile robot may use one or more sensors, such as cameras, proximity sensors, ultrasonic sensors, and so forth. In addition, various navigation aids, such as tags that can be detected using computer vision, may be used to improve or enhance precision of movement for an autonomous mobile robot. In one example, a machine readable tag may be located adjacent to a destination, and the autonomous mobile robot may read the machine readable tag and determine its location and/or orientation (e.g., relative to the tag for instance) with improved precision. However, such machine readable tags may need to be placed perpendicular to a floor surface, or a surface along with the autonomous mobile robot is moving, so as to provide visibility. Accordingly, a vertical support may be used to vertically mount such tags. Such vertical supports may create obstacles on the floor of the facility and may be impractical to use in some environments.

Embodiments of the disclosure provide improved endpoint approach and localization for autonomous mobile robots or autonomous robotic vehicles by providing floor-mounted guides that allow autonomous mobile robots to navigate with increased precision in spaces with tight tolerances, while avoiding the need to vertically mount the guides. As a result, a floor surface of a facility may remain unobstructed. The floor-mounted guides described herein may allow for improved endpoint approach by autonomous mobile robots, as well as improved localization and pose detection, which may improve the ability of autonomous mobile robots to navigate in areas where high precision is beneficial, such as when docking at a charging station. Embodiments may therefore allow for increased precision during approach maneuvers and improved localization robustness, while providing a floor-mounted guide that can be detected from a range of up to two meters with a forward-facing camera. Some embodiments of the floor-mounted guide include a large (optionally brightly colored) border, and a consistent square shape, along with a machine readable code, such as a fiducial, disposed at or near a center of the floor-mounted guide. Once a floor-mounted guide is registered by an autonomous mobile robot, the autonomous mobile robot can transpose a relative position between the robot and the guide. This can be used to precisely guide the autonomous mobile robot to the center of the guide. Once the autonomous mobile robot is positioned over the guide, the autonomous mobile robot may take a snapshot of a center of the guide, which allows for a precise and trustworthy confirmation of the autonomous mobile robot's position and location.

Embodiments may therefore increase throughput and speed of consolidating items for multi-item orders and/or consolidating packages that are destined for certain related destinations, such as other fulfillment centers. Some embodiments include optimized process flows for processing of orders at fulfillment centers, as well as process flows or equipment to increase speed of consolidating products in a multi-item order and/or speed of sorting packages. As a result, throughput of fulfillment centers may be improved, and/or logistics of fulfillment center operations may be less complicated.

Referring to FIG. 1, an example use case 100 for improved endpoint approach and localization for autonomous mobile robots and an example process flow is depicted in accordance with one or more embodiments of the disclosure. Although discussed in the context of online orders, other embodiments may be directed to any suitable use case where products are picked and sorted, or packages are sorted, such as instances where users may pick up orders rather than receiving a shipment, instances where items are aggregated for transport to another fulfillment center, and so forth.

In FIG. 1, a fulfillment center may include a robotic storage platform 110, a routing sorter 120, one or more item sorting systems 130, and one or more packing stations 140. The robotic storage platform 110 may be a portion of the fulfillment center at which products picked from product inventory are placed. Inventory may be stored in containers in foldable containers in some instances. Robots may be used to pick products from inventory and to deliver to the robotic storage platform in some instances, while in other instances, manual effort or a combination thereof may be used to pick products. The picking process at the robotic storage platform may include locating a product in an order, obtaining the product, and sending the product to the robotic storage platform 110, such as via a conveyor belt. In the illustrated embodiment, products at the robotic storage platform 110 may be placed in a container, such as a tote. The tote may be assigned to, or otherwise associated with, a particular item sorting system machine in some instances. For example, a certain tote may be associated with a certain item sorting system, such that products that are designated to be picked and placed in the tote are for orders that are to be consolidated at that particular item sorting system. The association between the tote and the item sorting system may be static in some instances. In other embodiments, there may not be any association between totes and item sorting systems, or associations may be dynamic.

At the routing sorter 120, totes including products that have been picked may be routed to the appropriate or designated item sorting system. For example, the routing sorter 120 may optionally determine an identifier associated with the tote, and may determine one or more item sorting systems to which the tote is to be routed using the identifier or using another factor, such as sortation system load. The routing sorter 120 may route or direct the tote to an item sorting system.

The item sorting systems 130 may include one or more item sorting system machines. In FIG. 1, a first item sorting system 132, a second item sorting system 134, a third item sorting system 136, and so forth may be included. Any number of item sorting systems may be included. Some or all of the item sorting systems may optionally be associated with certain totes. The item sorting systems may be used to consolidate or otherwise aggregate products for single or multi-item orders and/or for transfer to a different fulfillment center. For example, a first tote may include a first item of a multi-item order, and a second tote may include a second item of the multi-item order. The item sorting system may therefore identify the orders associated with the respective products in a tote, and may transport the products to a container, such as a tote, a flexible container, a specific chute leading to a container, or a different container associated with the order. When the order is complete with all of the products in the associated chute or container, the order may be packed. In instances where a container is designated for a different fulfillment center, as opposed to an online order, the container may be packed when full, as opposed to when certain items are placed into the container (e.g., there may not be any specific items that need to be in the container before packing, rather, the container may just be a certain threshold full, etc.). Accordingly, a specific item sorting system may be designated for fulfillment of a particular multi-item order. As a result, all of the products in the multi-item order may be placed in totes that are directed to that particular item sorting system. At the item sorting systems 130, totes that are received via the routing sorter 120 may be emptied, and the products in the respective totes may be transported to the appropriate chutes or containers for the orders for which the products were picked.

After a single or multi-item order is complete (e.g., the item sorting system has delivered all of the products in the order to the appropriate chute, container, etc.), or when a container designated for another fulfillment center is full (where full is a configurable threshold, such as about 60% full capacity, 70% full capacity, 80% full capacity, 90% full capacity, etc.), the order may be packed at the packing station 140. In some embodiments, one or more packing stations may be included. In some instances, a packing station may service more than one item sorting system, while in other instances, more than one packing station may service one item sorting system. In the illustration of FIG. 1, a first packing station 142 may be used to pack orders from the first item sorting system 132, a second packing station 144 may be used to pack orders from the second item sorting system 134, a third packing station 146 may be used to pack orders from the third item sorting system 136, and so forth. At the packing stations 140, the orders may be placed into boxes and sealed for subsequent shipment. The packages may then be processed for shipment to the user. For example, the packages may be placed into foldable containers for shipment to another fulfillment center, a sort center, or another facility. At the subsequent facility, the foldable container may be dumped to remove its contents. Such foldable containers, or other containers used during the process, may be transported using autonomous mobile robots as described herein.

At the fulfillment center, an example process flow 150 illustrated in FIG. 1 may be implemented to improve the efficiency and/or throughput of the fulfillment center. At a first block 160, items may be picked from the robotic storage platform 110 into a tote that may optionally be associated with a specific item sorting system. At a second block 170, the tote may be sent to the routing sorter 120 for routing to an item sorting system. At a third block 180, the items from the tote may be sorted for an order with multiple item by the specific item sorting system. At a fourth block 190, the items may be packed into a shipment when all of the items in the order are sorted.

Figure 2:
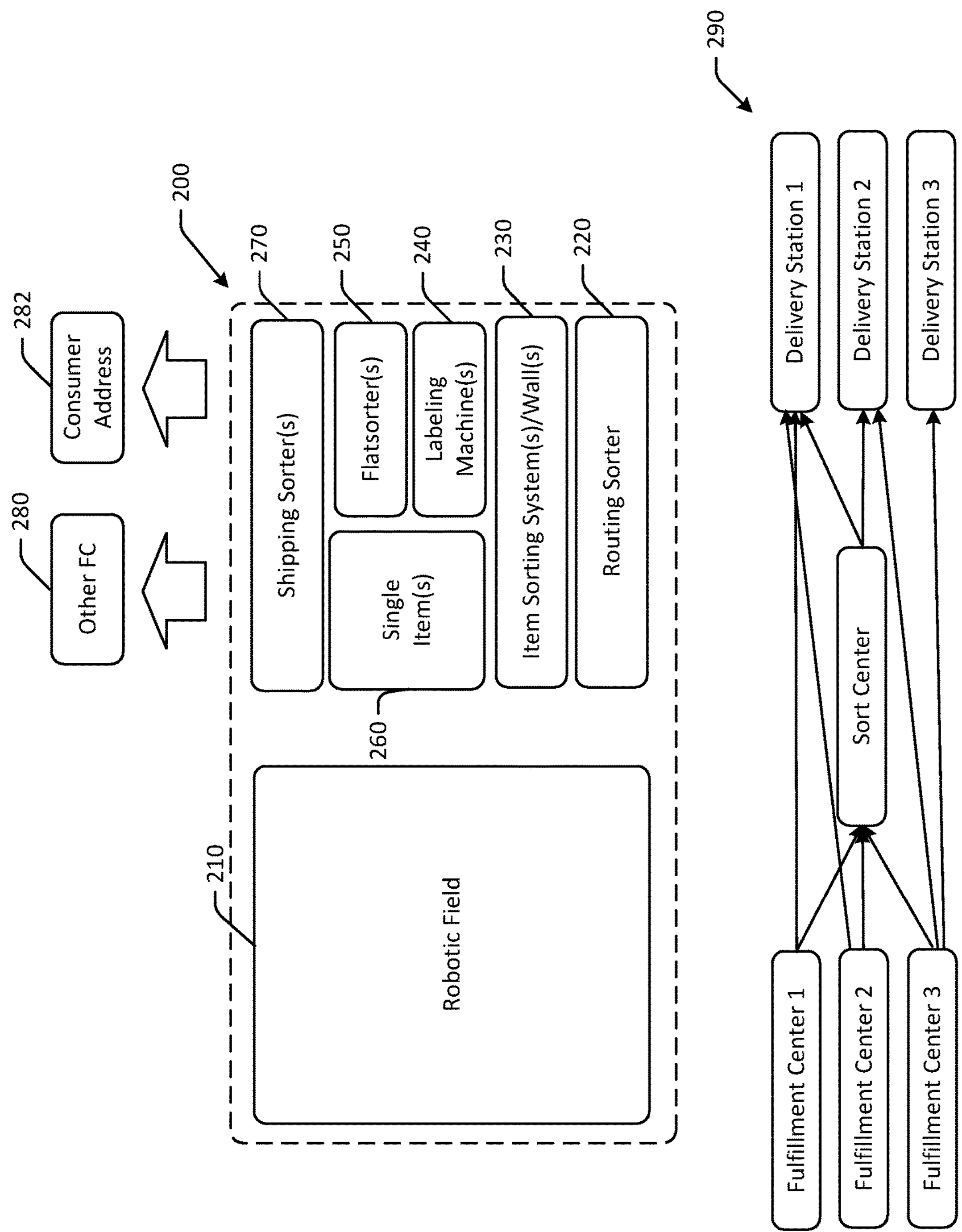
FIG. 2 is a hybrid schematic illustration of an example use case for improved endpoint approach and localization for autonomous mobile robots throughout a facility and between facilities in accordance with one or more embodiments of the disclosure.

FIG. 2 is a hybrid schematic illustration of an example use case for improved endpoint approach and localization for autonomous mobile robots throughout a facility and between facilities in accordance with one or more embodiments of the disclosure. Other embodiments may include additional or fewer components.

In FIG. 2, an example layout of a fulfillment center 200 is depicted. The fulfillment center 200 may include a robotic field 210 at which product inventory may be stored for picking (e.g., optionally in one or more flexible container pods, etc.), one or more routing sorters 220 that may be used to direct totes or other containers to item sorting systems, one or more item sorting systems or walls 230 used to consolidate products for multi-item orders and/or to pack multi-item orders, one or more single item sections 260 that may be used to pack single item orders, one or more labeling machines 240 that may be used to apply shipping labels to packages, one or more flat sorters 250 and shipping sorters 270 to sort labeled shipments (e.g., by destination, carrier, etc.) for pickup from the fulfillment center 200.

In some embodiments, the item sorting systems described herein may be a part of the flat sorters 250, where the item sorting systems may be configured to sort packages into containers or chutes. In such embodiments, the item sorting systems may or may not also be used at the item sorting systems 230 portion of the fulfillment center 200. Accordingly, the item sorting systems may be disposed at, or otherwise coupled to, a cross belt conveyor system, such as the flat sorters 250 of the fulfillment center 200.

The item sorting system machines 230 may include containers and/or containers of different sizes (e.g., small, medium, large, etc.) and may be configured, in one example, to handle items that weigh up to twenty or more pounds (e.g., 100 pounds or more, etc.). In some embodiments, the item sorting system machines 230 may include multiple chutes, such as about 328 chutes, and may be configured to sort items at a rate of about 2,100 units per hour or more. In some instances, the item sorting system machines 230 may have two inductors (e.g., one on each side, etc.), and may be modular. For example, the item sorting system machines 230 may each include sixteen expansion modules, where expansion modules may be defined as three two-sided columns next to one another for a total length of about 80 feet. The item sorting system machines 230 may reduce labor and capital costs associated with processing orders.

In some embodiments, the item sorting system 230 may replace other processes, such as manual processes. The item sorting system 230 may be a cross-belt shuttle sorter that sorts singulated products into containers or totes. Item sorting systems 230 may be capable of sorting at a rate of 2,100 units per hour or more. Certain item sorting systems 230 may be configured to handle items of up to twenty pounds, or more in some instances, with dimensions of about 18"×14"×8" or greater, which may cover almost all products at the fulfillment center 200. The item sorting systems 230 may operate as a high-speed, high-destination sort solution that intakes items or packages and sorts them into containers using a shuttle that travels vertically and horizontally inside the machine (or outside in some instances).

Individual item sorting system machines may be item sorting systems, and may include a number of, such as two or more, modular sorting machines coupled in series, or otherwise adjacent to each other and connected. The modular sorting machines may include a first modular sorting machine. The modular sorting machines may be configured to singulate items from a tote including a plurality of items into a plurality of chutes or containers (e.g. induct individual items from a container that has multiple items, and place the inducted items into the appropriate chute to be routed to a container, where chutes or containers are associated with multi-item orders). The tote from which items are inducted may be associated with the individual item sorting system machine (e.g., the modular sorting machines that form the individual item sorting system machine, etc.). In some embodiments, item sorting systems or individual item sorting machines may be configured to induct and sort packages based at least in part on a destination of the respective packages. Destinations may be internal destinations within a fulfillment center, external destinations to geographic regions or addresses, or other destination types. For example, output from the fulfillment center 200 may include containers of items routed to other fulfillment centers 280, packages addressed to consumer addresses 282, and so forth.

Accordingly, in some embodiments, item sorting systems may be arranged in rows and may receive totes from a routing sorter, thereby streamlining fulfillment center operation and reducing labor and space costs. The item sorting systems may process totes for multi-order sortation and consolidation. As a result, there may no longer be a need to singulate and send items to a wall for manual extraction, because each tote may be assigned to a particular item sorting system machine. Induct stations can be replaced with item sorting system machines.

In another embodiment, pickers may pick items directly to a segmented belt conveyor at a station that may be near an item sorting system machine. Other nearby pick stations may also pick items directly to conveyance for the same item sorting system machine. Picked items being transported to a single item sorting system machine may merge together to be inducted into their unique item sorting system machine, where multi-item orders may be consolidated and sent to packing.

Some embodiments may be used across facilities in a fulfillment network. An example fulfillment network 290 is depicted in FIG. 2. The fulfillment network 290 may include a number of fulfillment centers, a number of sort centers, a number of delivery stations, and so forth. The fulfillment centers may be used to pack items for fulfillment. Packed items may be routed to a sort center for redirection to an appropriate delivery station. In some instances, packed items may be routed directly to a delivery station while bypassing sort centers. Embodiments of the autonomous mobile robots described herein may be configured to transport containers within facilities as they move from a first facility to a second facility, a third facility, and so on, as the containers seamlessly move amongst different facilities in a fulfillment network. For example, a foldable container may move from a fulfillment center to a sort center, and then on to a delivery station or other facility, thereby providing a flexible and dynamic solution without having to unload contents of the foldable container. At any of the locations, the foldable containers may be transported using autonomous mobile robots as described herein.

Embodiments of the disclosure include improved endpoint approach and localization for autonomous mobile robots. The autonomous mobile robots may be used to transport containers and/or other items throughout facilities. Certain embodiments may improve processing speed and/or throughput of fulfillment centers. Certain embodiments may improve performance of mechanical equipment for sortation and/or consolidation of items for multi-item orders. While described in the context of online orders, aspects of this disclosure are more broadly applicable to other forms of product sortation.

Example embodiments of the disclosure provide a number of technical features or technical effects. For example, in accordance with example embodiments of the disclosure, certain embodiments of the disclosure may improve processing speed, throughput, and/or efficiency of fulfillment centers. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

Illustrative Embodiments and Use Cases

Figure 3:
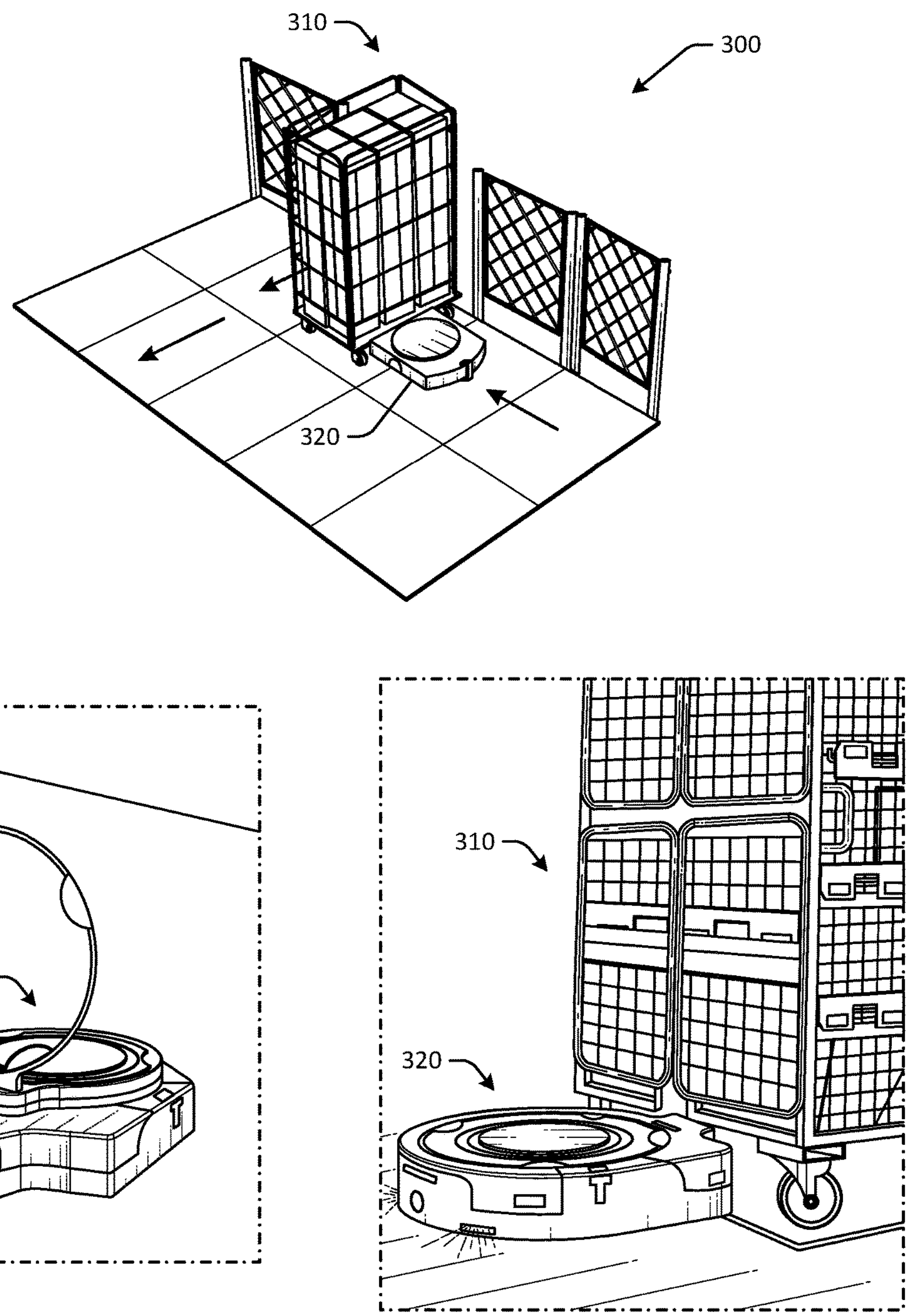
FIG. 3 is a schematic illustration of an autonomous robotic vehicle engaging a container in accordance with one or more embodiments of the disclosure.

FIG. 3 is a schematic illustration of an autonomous mobile robot engaging a container in accordance with one or more embodiments of the disclosure. Other embodiments may include additional or fewer components. The illustration of FIG. 3 is not to scale, and may not be illustrated to scale with respect to other figures. The autonomous mobile robot and the foldable container illustrated in FIG. 4 may be the same autonomous mobile robot and foldable container discussed with respect to FIGS. 1-2.

In the example of FIG. 3, a foldable container 310 may be positioned in an environment 300, such as a fulfillment center floor, a warehouse environment, or another environment. The foldable container 310 may have one or more mesh sidewalls. To move throughout the environment 300, the foldable container 310 may be rolled using one or more wheels. For example, a manual operator may move the foldable container 310 by pushing or pulling the foldable container 310 from one location to another. The foldable container 310 may receive, carry, and transport various packages, boxes, items, products, or other objects of various types. In addition, the foldable container 310 may be configured to be lifted, carried, moved, and placed between positions within a material handling facility by robotic drive units, such as the robot 320, or other material handling equipment. In this manner, the foldable container 310 can be pushed by associates on surfaces, e.g., sort center floors, and the foldable container 310 can also be carried and transported by robotic drive units 320.

The foldable container 310 may also be moved using a robot 320, such as an autonomous mobile robot. For example, the robot 320 may be configured to tunnel or otherwise position itself underneath the foldable container 310. The robot 320 may then lift the foldable container 310 off the ground, such that the wheels are separated from the ground, and the robot 320 may then transport the foldable container 310 from one location to another.

The foldable container 310 may maintain the ability to be moved by humans and robots, while also maintaining the ability to fold from a rectangular configuration to an L-shaped folded configuration. The foldable container 310 may include a locking bottom container platform that provides structural rigidity to enable lifting by the robot 320, while also providing the ability for the foldable container 310 to fold.

Accordingly, the foldable container 310 may be configured to be transported using both (i) the one or more, or plurality, of wheels via manual pushing, and (ii) robotic manipulation to lift and move the foldable container 310, such as by the robot 320. The foldable container 320 may be configured to allow an autonomous robot, such as the robot 320, to tunnel underneath a bottom container platform of the foldable container 310. The foldable container 310 may be configured to be lifted from the bottom container platform by an autonomous robot or other robot 320 that is positioned at least partially or entirely underneath a center or middle portion of the foldable container 310 when the foldable container 310 is in the unfolded position (e.g., a rectangular configuration, etc.).

The wheels may include one or more freely-rotating swivel casters associated with a bottom surface of the foldable container 310. For example, the foldable container 310 may include four freely-rotating swivel casters, with one positioned at each corner of the foldable container 310. In some examples, two of the four casters may have a swivel locking feature, such as a manually or foot-operated swivel locking feature, and the other two of the four casters may have a caster rotation locking feature, such as a manually or foot-operated caster rotation locking feature.

The autonomous mobile robot 320 is depicted in an isolated view in FIG. 3. The autonomous mobile robot 320 may include one or more forward-facing sensors 330, such as a camera sensor 330, that can be used to detect floor-mounted guides. The autonomous mobile robot 320 may include one or more container handling features 340 that may be configured to engage and/or manipulate the container 310, such as lift the container 310, rotate the container 310, and so forth. The autonomous mobile robot 320 may be configured to guide itself or otherwise navigate under the container 310, and to transport the container 310 from one location to another.

Figure 4A:
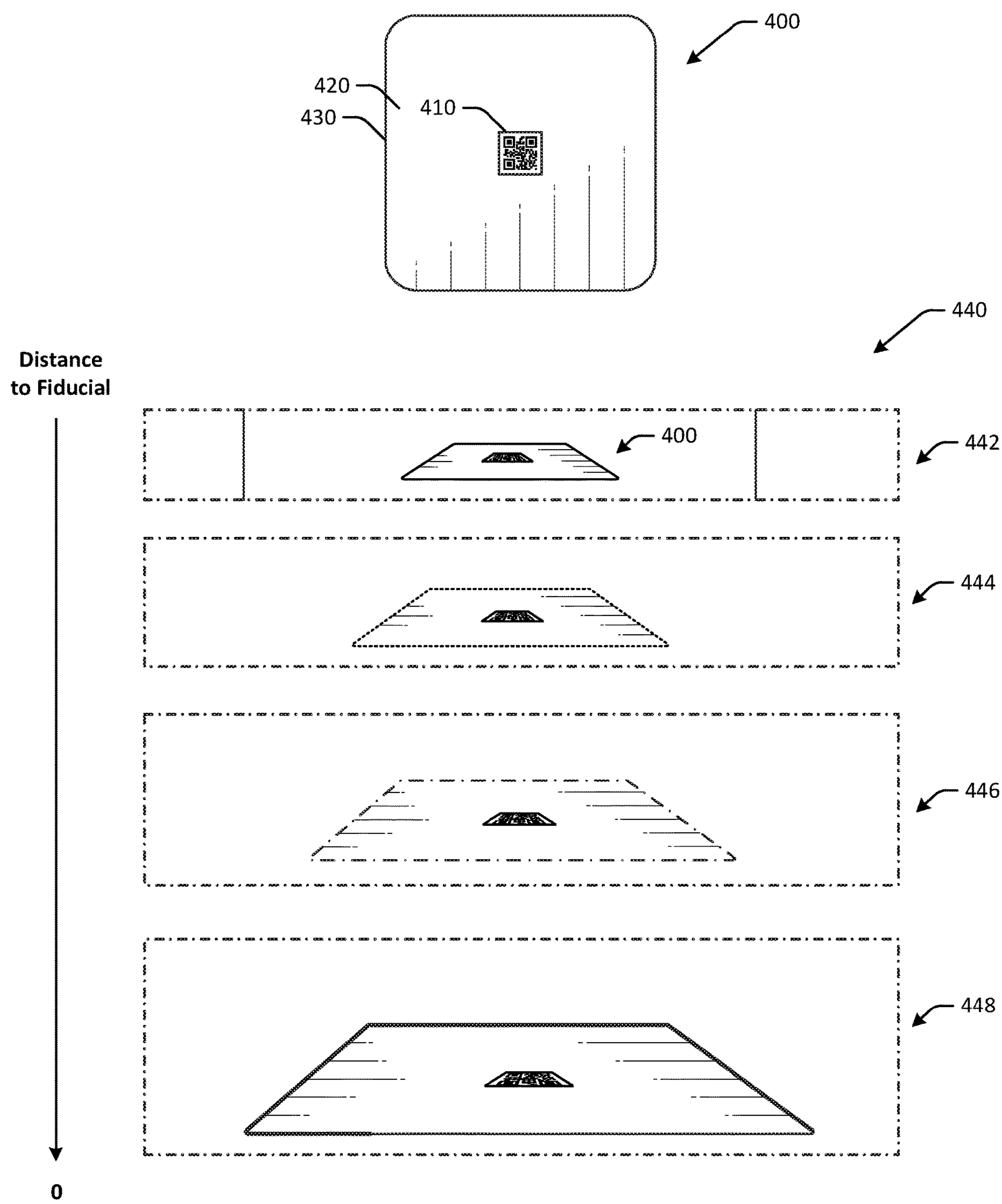
FIGS. 4A-4B are schematic illustration of an example floor-mounted fiducial, along with illustrations of an approach to the floor-mounted fiducial from an autonomous robotic vehicle viewpoint, and an example process flow in accordance with one or more embodiments of the disclosure.
Figure 4B:
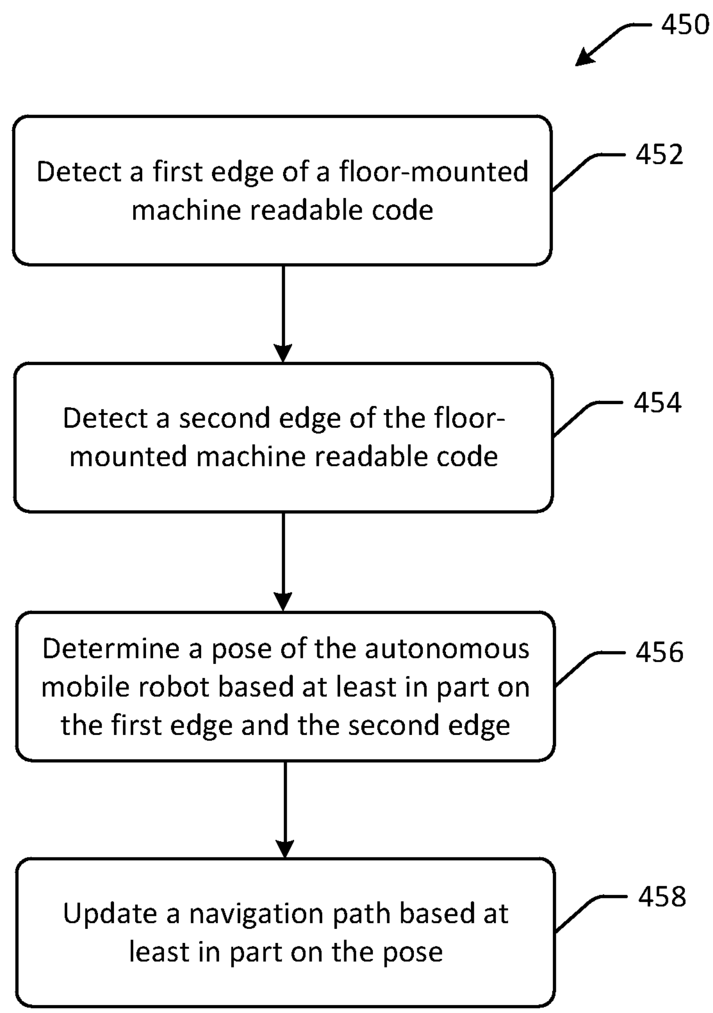

FIGS. 4A-4B are schematic illustrations of an example floor-mounted guide 400, along with illustrations of an approach to the floor-mounted fiducial from an autonomous robotic vehicle viewpoint, and an example process flow 450 in accordance with one or more embodiments of the disclosure. Other embodiments may include additional or fewer components. The illustrations of FIGS. 4A-4B may not be to scale, and may not be illustrated to scale with respect to other figures. The autonomous mobile robot illustrated in FIG. 4A may be the same autonomous mobile robot discussed with respect to FIGS. 1-3.

In FIG. 4A, the floor-mounted guide 400 is depicted in top view, as well as from a field of view of a camera, such as a front-facing camera, of an autonomous mobile robot. The floor-mounted guide 400 may include a machine readable code 410 disposed in a center of the floor-mounted guide 400. The machine readable code 410 may be a fiducial, a QR code, an RFID tag, an NFC tag, a beacon, or another two-dimensional or relatively flat three-dimensional guide. The floor-mounted guide 400 may include a border 420 that surrounds the machine readable code 410. A color of the border 420 may have a high contrast relative to the machine readable code 410. For example, the guide may be mostly dark colors, such as black, and the border 420 may be a bright green or white color for relatively high contrast. The floor-mounted guide 400 may have one or more edges 430 that may be detected by the camera of the autonomous mobile robot, where the edges 430 are edges of the border 420. Edge detection of the border 420 may be easier to perform (e.g., using computer vision and images captured at the relatively low angle between a floor surface and the camera of the autonomous mobile robot, etc.) than corner detection, which may be typically used in such environments.

In some embodiments, the floor-mounted guide 400 may have an optionally bright colored border surrounding the fiducial, where the bright colored or other colored border has a first area that is at least ten times greater than a second area of the fiducial. For example, 80-90% of the surface area of the floor-mounted guide 400 may be allocated to the border 420 in some instances. The floor-mounted guide 400 may be in the form of a single-piece or multi-piece sticker assembly, a painted floor feature, and/or otherwise coupled to a floor surface. For multi-piece sticker assemblies, the sticker assemblies may be assembled using one or more components that are joined or otherwise assembled together, such as two or more stickers. In some instances, the floor-mounted guide 400 may have an anti-glare or anti-reflective coating.

A series of images 440 depicts example appearance of the floor-mounted guide 400 in a field of view of the camera of the autonomous mobile robot. As the autonomous mobile robot approaches the floor-mounted guide 400, the appearance of the floor-mounted guide 400 may change in the field of view. For example, at a first distance, a first image 442 may be captured, in which the autonomous mobile robot may determine that it is within a predetermined distance of a known location of the floor-mounted guide 400, such as between 1-5 meters. At a second distance that is less than the first distance, a second image 444 may be captured, during which an edge detection process may be initiated. At a third distance that is less than the second distance, a third image 446 may be captured and one or more edges of the floor-mounted guide 400 may be detected. In some instances, a confidence interval or confidence level may be determined for one or more of the edges detected, where a threshold, such as 80%, can be used to determine whether a detected edge is to be treated as an actual edge of the floor-mounted guide 400. For example, a controller of the autonomous mobile robot may be configured to determine that a confidence interval associated with at least one of the edges is greater than a threshold. At a fourth distance that is less than the third distance, a fourth image 448 may be captured and the autonomous mobile robot may make pose and/or location/localization adjustments based at least in part on the position of the floor-mounted guide 400, thus resulting in improved endpoint detection and localization.

As depicted in the sample images of FIG. 4A, an angle between a camera plane along which the camera is oriented and a floor plane along which the floor-mounted guide is mounted may be less than 45 degrees in some embodiments, resulting in increased difficulty of detection of the floor-mounted guide 400. To that end, as the autonomous mobile robot approaches the floor-mounted guide 400, the floor-mounted guide 400 may occupy at least 0.5%, such as about 7.5%, of a field of view of the camera at a distance of between 0.5 and 1.0 meters (between the camera and the floor-mounted guide 400). In other embodiments, at a distance of between 0.5 and 1.0 meters, the floor-mounted guide 400 may be several hundred pixels wide in the camera field of view.

In FIG. 4B, the example process flow 450 may be performed, for example, by a controller of the autonomous mobile robot and/or a computer system in communication with the autonomous mobile robot. A system may include a floor-mounted guide disposed on a floor of an environment, and an autonomous mobile robot having a camera and a controller. The autonomous mobile robot may be configured to autonomously navigate in the environment, where the controller may be configured to perform the operations of the example process flow 450. At block 452, the controller may detect a first edge of a floor-mounted guide (e.g., using a camera, such as a front-facing camera). At block 454, the controller may detect a second edge of the floor-mounted guide. At block 456, the controller may determine a pose of the autonomous mobile robot based at least in part on the first edge and the second edge. At block 458, the controller may update a navigation path based at least in part on the pose. In some embodiments, a location may be determined based at least in part on edge detection, and navigation paths may be updated based on a determined location. In some embodiments, prior to detecting the first edge of the floor-mounted guide the controller may determine that the autonomous mobile robot is within a predetermined distance of the second location (e.g., before the controller begins searching for edges, etc.).

Figure 5:
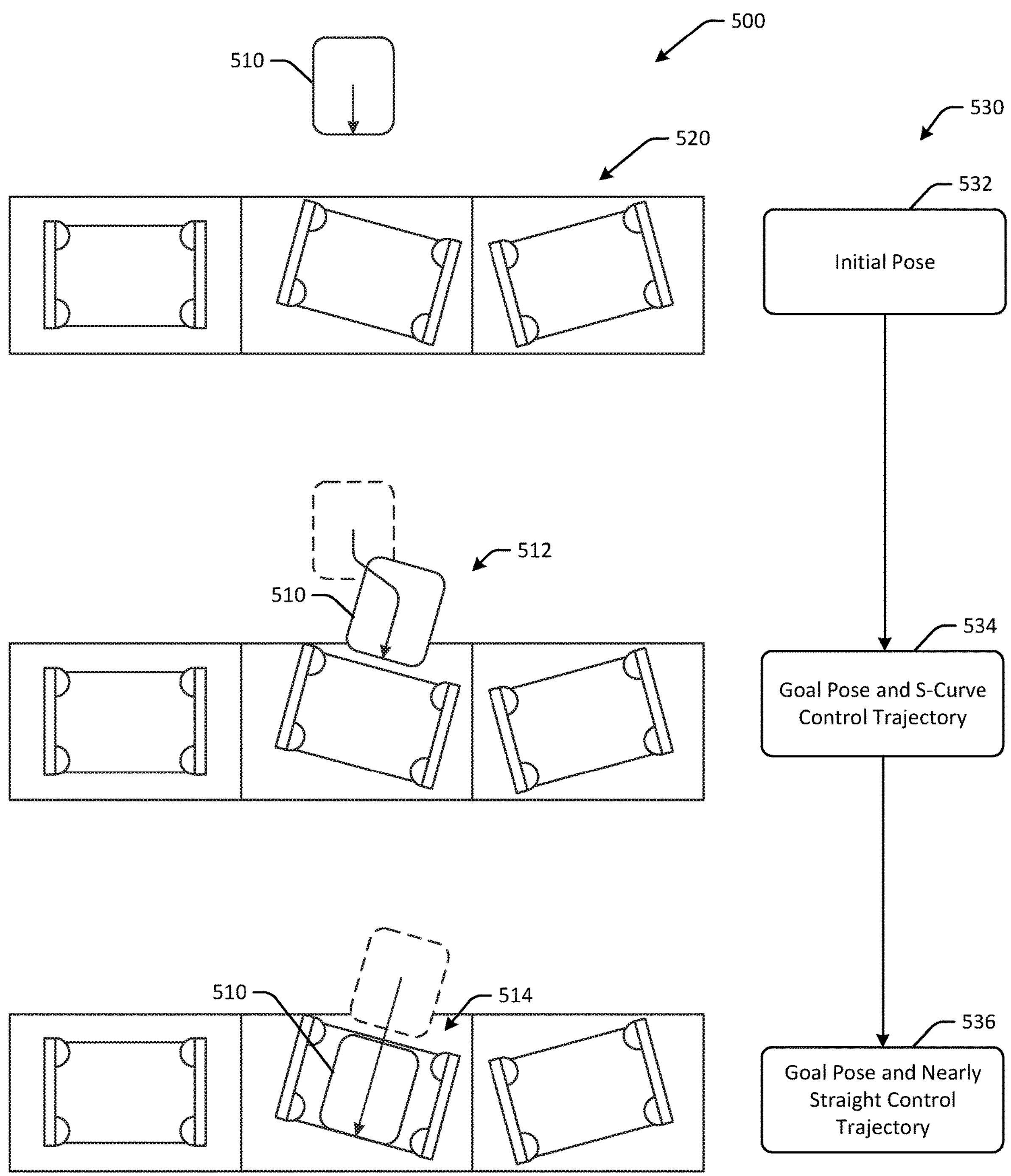
FIG. 5 is a schematic illustration of an autonomous robotic vehicle having improved endpoint approach and localization in accordance with one or more embodiments of the disclosure.

FIG. 5 is a schematic illustration of an autonomous robotic vehicle having improved endpoint approach and localization in accordance with one or more embodiments of the disclosure. Other embodiments may include additional or fewer components. The illustration of FIG. 5 may not be to scale, and may not be illustrated to scale with respect to other figures. The autonomous robotic vehicle illustrated in FIG. 5 may be the same autonomous robotic vehicle discussed with respect to FIGS. 4A-4B.

In FIG. 5, an autonomous mobile robot 510 may be navigating towards a container 520 in an environment 500. As the autonomous mobile robot 510 approaches the container 520, the autonomous mobile robot 510 may, at operation 532 of process flow 530, determine its initial pose with respect to a floor-mounted machine-readable code that may be disposed under the container 520. The autonomous mobile robot 510 may move to a second position 512 that is closer to the container 520. At operation 534 of the process flow 530, the autonomous mobile robot 510 may determine a goal pose and S-curve control trajectory or navigation path based at least in part on the initial pose. The autonomous mobile robot 510 may then move under the container 514. At operation 536 of the process flow 530, the autonomous mobile robot 510 may determine the goal pose and a nearly straight control trajectory or navigation path to arrive on top of the floor-mounted guide. Accordingly, the autonomous mobile robot 510 may have improved endpoint approach and localization.

Figure 6A:
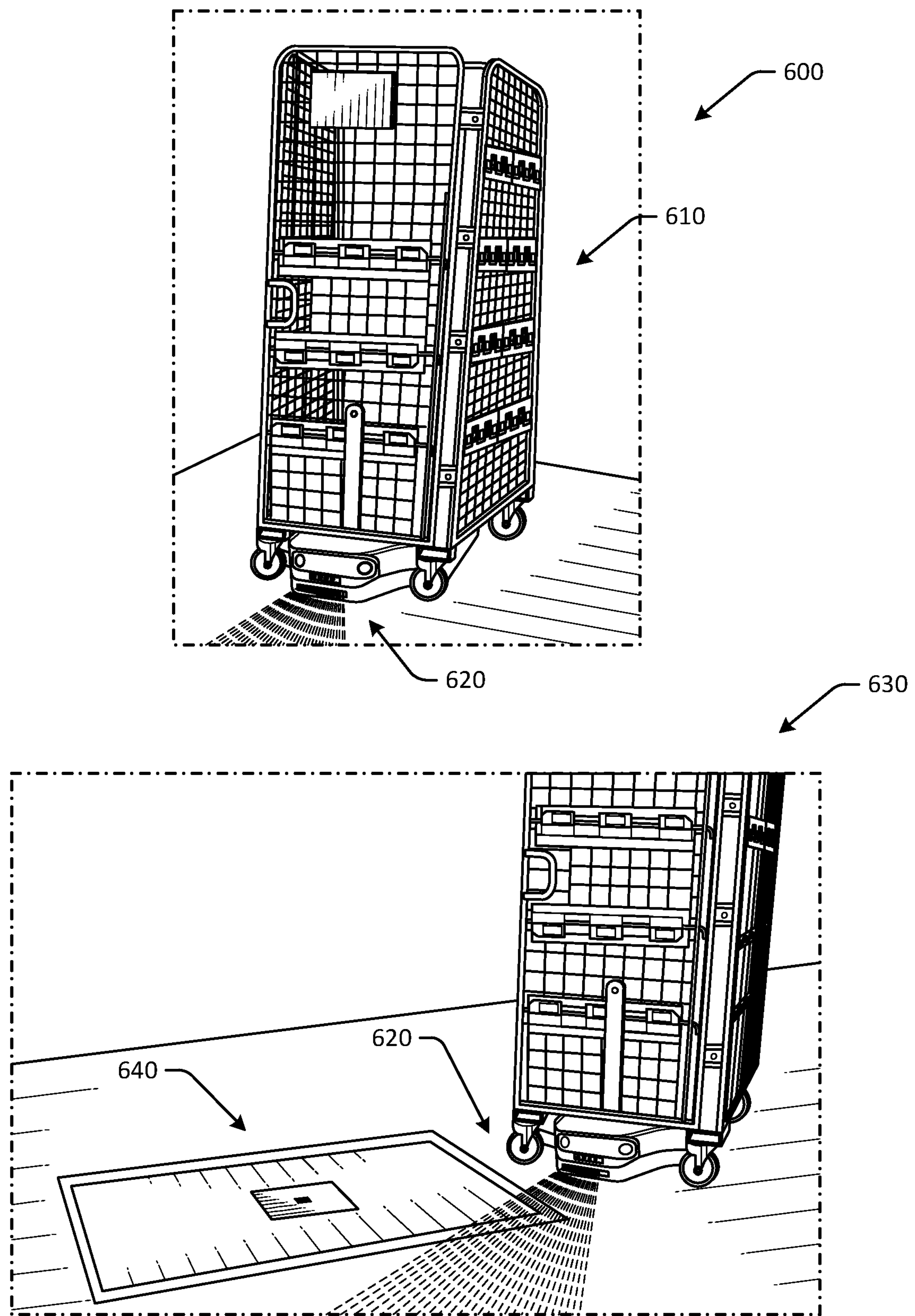
FIGS. 6A-6C are schematic illustrations of a container being transported to a destination by an autonomous robotic vehicle having improved endpoint approach and localization in accordance with one or more embodiments of the disclosure.
Figure 6B:
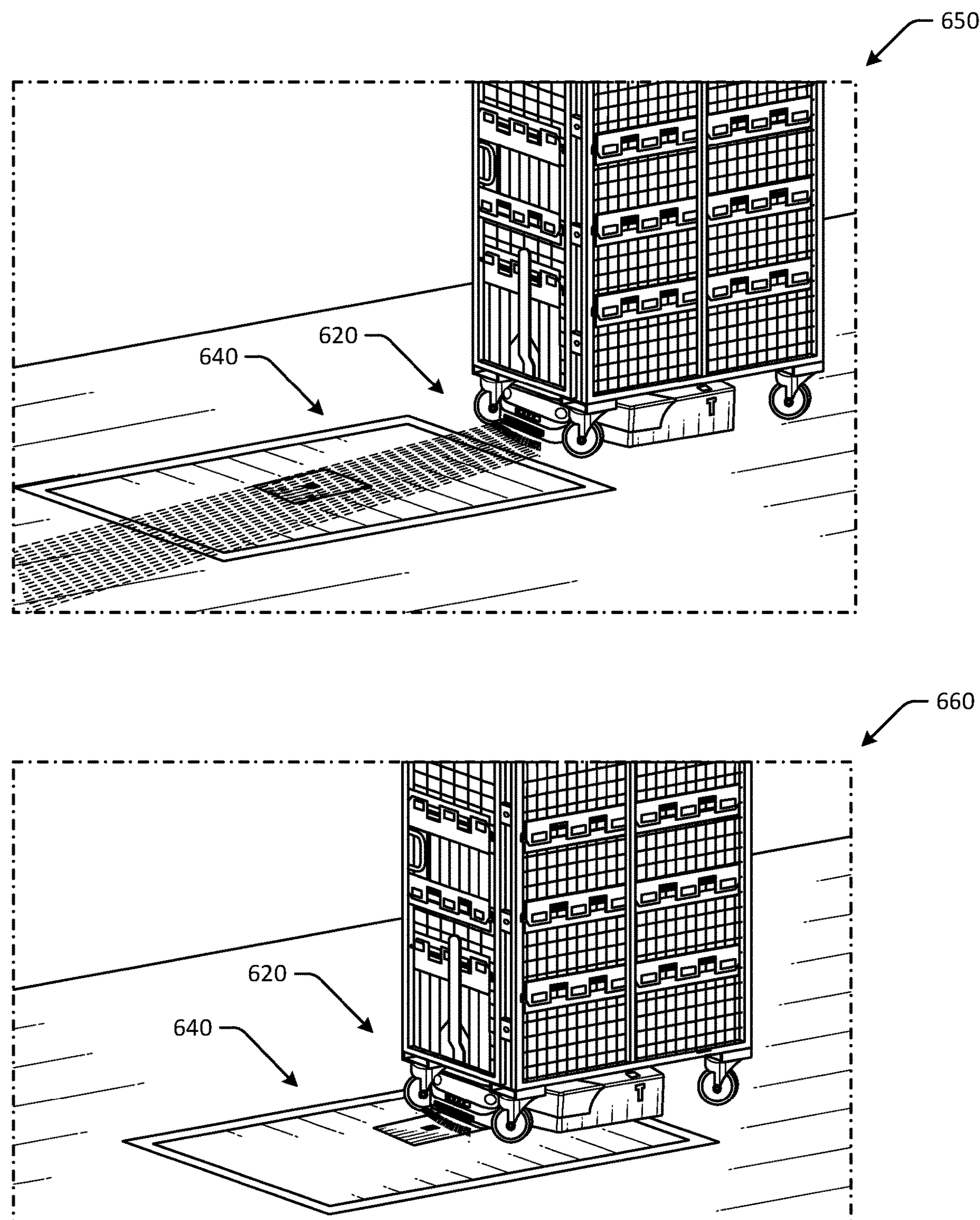
Figure 6C:
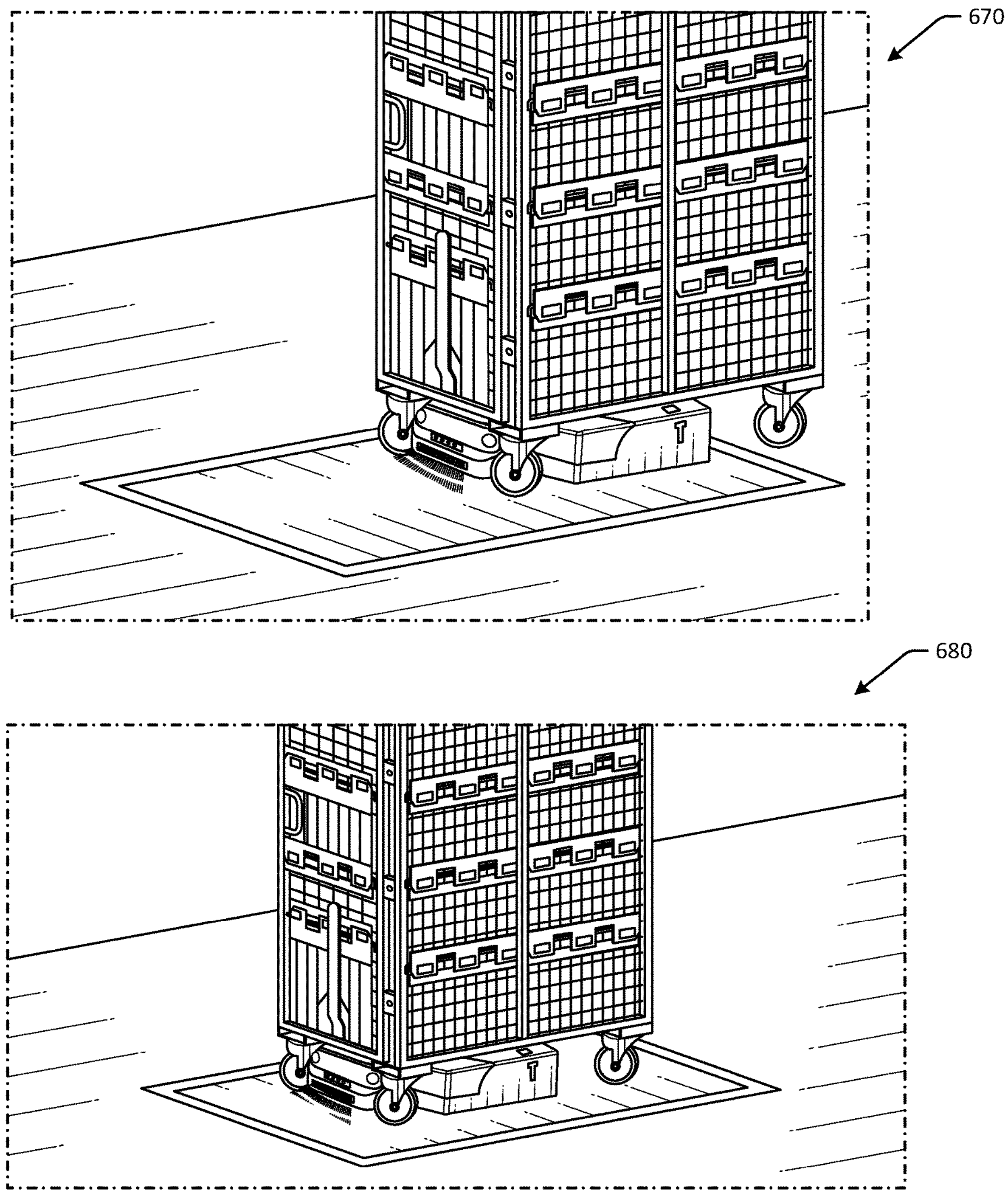

FIGS. 6A-6C are schematic illustrations of a container being transported to a destination by an autonomous robotic vehicle having improved endpoint approach and localization in accordance with one or more embodiments of the disclosure. Other embodiments may include additional or fewer components. The illustration of FIGS. 6A-6C may not be to scale, and may not be illustrated to scale with respect to other figures. The components illustrated in FIGS. 6A-6C may be used with any of the embodiments discussed with respect to FIGS. 1-5.

In FIG. 6A, an autonomous mobile robot 620 may retrieve a container 610 at a first location 600. The autonomous mobile robot 620 may begin navigating toward a destination. As the autonomous mobile robot 620 moves, errors may occur due to a number of factors, where such errors may increase the longer the distance traveled by the autonomous mobile robot 620. At a second location 630 adjacent to a floor-mounted guide 640, such as within 1-2 meters of the floor-mounted guide 640, the autonomous mobile robot 620 may begin searching for the floor-mounted guide 640 using a front-facing camera or other sensor.

In FIG. 6B, at a third location 650, the autonomous mobile robot 620 may detect the floor-mounted guide 640 and may adjust its pose based at least in part on the detected location of the floor-mounted guide 640, so as to align itself with the floor-mounted guide 640. At a fourth location 660, the autonomous mobile robot 620 may move in a straight movement towards the floor-mounted guide 640.

In FIG. 6C, at a fifth location 670, the autonomous mobile robot 620 may continue moving on the floor-mounted guide 640 until a sixth location 680 is reached, at which the autonomous mobile robot 620 may determine it is on top of the center of the floor-mounted guide 640. For example, a fiducial may be disposed at the center of the floor-mounted guide 640, and the autonomous mobile robot 620 may determine it is on top of the fiducial using a downward-facing camera. In one embodiment, the autonomous mobile robot 620 may include a first camera that is a front-facing camera, and a second camera that is a downward-facing camera, and the controller may be configured to determine that the autonomous mobile robot is directly on top of a center of the floor-mounted guide using the second camera. In some embodiments, detection of the fiducial using the downward-facing camera can be used to determine an updated pose of the autonomous mobile robot 620 with improved accuracy (e.g., relative to a pose determination using the edge detection with the front-facing camera, etc.).

Embodiments therefore improve the predictability and accuracy of drive poses, perceived poses, and map poses, and allow for determination of implications of identification failures and retries for charger, pickup, and drop-off scenarios.

One or more operations of the methods, process flows, or use cases of FIGS. 1-6C may have been described above as being performed by a user device, or more specifically, by one or more program module(s), applications, or the like executing on a device. It should be appreciated, however, that any of the operations of the methods, process flows, or use cases of FIGS. 1-6C may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-6C may be described in the context of the illustrative devices, it should be appreciated that such operations may be implemented in connection with numerous other device configurations.

The operations described and depicted in the illustrative methods, process flows, and use cases of FIGS. 1-6C may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-6C may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 7:
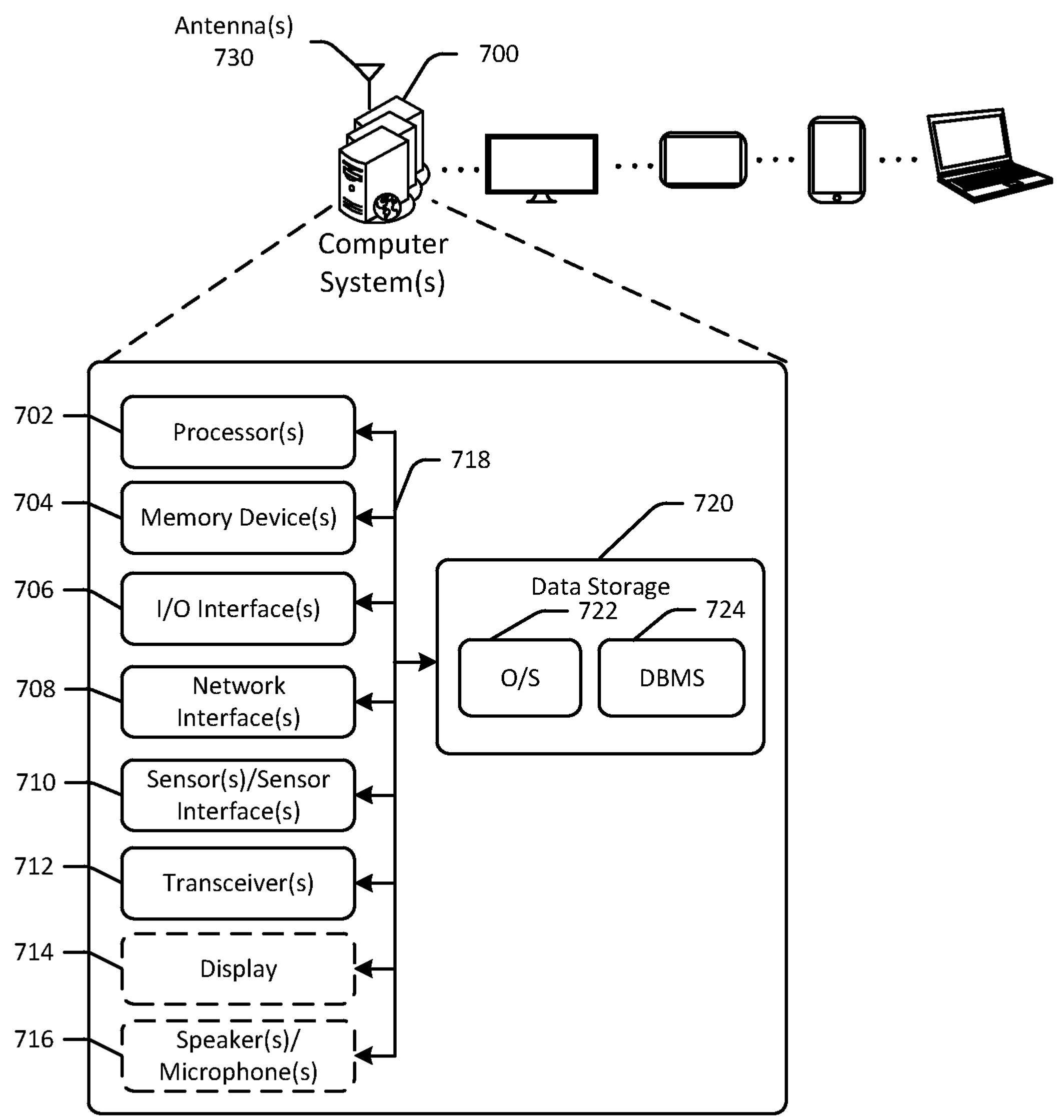
FIG. 7 schematically illustrates an example architecture of a computer system associated with an autonomous robotic vehicle in accordance with one or more embodiments of the disclosure.

FIG. 7 is a schematic block diagram of one or more illustrative computer system(s) 700 in accordance with one or more example embodiments of the disclosure. The computer system(s) 700 may include any suitable computing device including, but not limited to, a server system, a voice interaction device, a mobile device such as a smartphone, a tablet, an e-reader, a wearable device, or the like; a desktop computer; a laptop computer; a content streaming device; or the like. The computer system(s) 700 may correspond to an illustrative device configuration for a computer system used in conjunction with any one of the robotic system(s) of FIGS. 1-6C, such as robotic manipulators and/or autonomous mobile robots.

The computer system(s) 700 may be configured to communicate with one or more servers, user devices, or the like. The computer system(s) 700 may be configured to cause the robotic system(s) to deposit containers into one or more pods, retrieve containers, transport containers, dump containers, control operation of autonomous vehicles, and so forth.

The computer system(s) 700 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computer system(s) 700 may include one or more processors (processor(s)) 702, one or more memory devices 704 (also referred to herein as memory 704), one or more input/output (I/O) interface(s) 706, one or more network interface(s) 708, one or more sensor(s) or sensor interface(s) 710, one or more transceiver(s) 712, one or more optional display(s) 714, one or more optional microphone(s) 716, and data storage 720. The computer system(s) 700 may further include one or more bus(es) 718 that functionally couple various components of the computer system(s) 700. The computer system(s) 700 may further include one or more antenna(s) 730 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 718 may include at least one of a system bus, a memory bus, an address bus, or a message bus, and may permit the exchange of information (e.g., data (including computer-executable code), signaling, etc.) between various components of the computer system(s) 700. The bus(es) 718 may include, without limitation, a memory bus or a memory controller, a peripheral bus, an accelerated graphics port, and so forth. The bus(es) 718 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 704 of the computer system(s) 700 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 704 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 704 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 720 may include removable storage and/or non-removable storage including, but not limited to, magnetic storage, optical disk storage, and/or tape storage. The data storage 720 may provide non-volatile storage of computer-executable instructions and other data. The memory 704 and the data storage 720, removable and/or non-removable, are examples of computer-readable storage media (CRSM) as that term is used herein.

The data storage 720 may store computer-executable code, instructions, or the like that may be loadable into the memory 704 and executable by the processor(s) 702 to cause the processor(s) 702 to perform or initiate various operations. The data storage 720 may additionally store data that may be copied to the memory 704 for use by the processor(s) 702 during the execution of the computer-executable instructions. Moreover, output data generated as a result of execution of the computer-executable instructions by the processor(s) 702 may be stored initially in the memory 704, and may ultimately be copied to the data storage 720 for non-volatile storage.

More specifically, the data storage 720 may store one or more operating systems (O/S) 722; one or more database management systems (DBMS) 724; and one or more program module(s), applications, engines, computer-executable code, scripts, or the like. Some or all of these module(s) may be sub-module(s). Any of the components depicted as being stored in the data storage 720 may include any combination of software, firmware, and/or hardware. The software and/or firmware may include computer-executable code, instructions, or the like that may be loaded into the memory 704 for execution by one or more of the processor(s) 702. Any of the components depicted as being stored in the data storage 720 may support functionality described in reference to corresponding components named earlier in this disclosure.

The data storage 720 may further store various types of data utilized by the components of the computer system(s) 700. Any data stored in the data storage 720 may be loaded into the memory 704 for use by the processor(s) 702 in executing computer-executable code. In addition, any data depicted as being stored in the data storage 720 may potentially be stored in one or more datastore(s) and may be accessed via the DBMS 724 and loaded in the memory 704 for use by the processor(s) 702 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 702 may be configured to access the memory 704 and execute the computer-executable instructions loaded therein. For example, the processor(s) 702 may be configured to execute the computer-executable instructions of the various program module(s), applications, engines, or the like of the computer system(s) 700 to cause or facilitate various operations to be performed in accordance with one or more embodiments of the disclosure. The processor(s) 702 may include any suitable processing unit capable of accepting data as input, processing the input data in accordance with stored computer-executable instructions, and generating output data. The processor(s) 702 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 702 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 702 may be capable of supporting any of a variety of instruction sets.

Referring now to other illustrative components depicted as being stored in the data storage 720, the O/S 722 may be loaded from the data storage 720 into the memory 704 and may provide an interface between other application software executing on the computer system(s) 700 and the hardware resources of the computer system(s) 700. More specifically, the O/S 722 may include a set of computer-executable instructions for managing the hardware resources of the computer system(s) 700 and for providing common services to other application programs (e.g., managing memory allocation among various application programs). In certain example embodiments, the O/S 722 may control execution of the other program module(s). The O/S 722 may include any operating system now known or which may be developed in the future including, but not limited to, any server operating system, any mainframe operating system, or any other proprietary or non-proprietary operating system.

The DBMS 724 may be loaded into the memory 704 and may support functionality for accessing, retrieving, storing, and/or manipulating data stored in the memory 704 and/or data stored in the data storage 720. The DBMS 724 may use any of a variety of database models (e.g., relational model, object model, etc.) and may support any of a variety of query languages. The DBMS 724 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computer system(s) 700 is a mobile device, the DBMS 724 may be any suitable lightweight DBMS optimized for performance on a mobile device.

Referring now to other illustrative components of the computer system(s) 700, the input/output (I/O) interface(s) 706 may facilitate the receipt of input information by the computer system(s) 700 from one or more I/O devices as well as the output of information from the computer system(s) 700 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computer system(s) 700 or may be separate. The I/O devices may further include, for example, any number of peripheral devices such as data storage devices, printing devices, and so forth.

The I/O interface(s) 706 may also include an interface for an external peripheral device connection such as universal serial bus (USB), FireWire, Thunderbolt, Ethernet port or other connection protocol that may connect to one or more networks. The I/O interface(s) 706 may also include a connection to one or more of the antenna(s) 730 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The computer system(s) 700 may further include one or more network interface(s) 708 via which the computer system(s) 700 may communicate with any of a variety of other systems, platforms, networks, devices, and so forth. The network interface(s) 708 may enable communication, for example, with one or more wireless routers, one or more host servers, one or more web servers, and the like via one or more networks.

The antenna(s) 730 may include any suitable type of antenna depending, for example, on the communications protocols used to transmit or receive signals via the antenna(s) 730. Non-limiting examples of suitable antennas may include directional antennas, non-directional antennas, dipole antennas, folded dipole antennas, patch antennas, multiple-input multiple-output (MIMO) antennas, or the like. The antenna(s) 730 may be communicatively coupled to one or more transceivers 712 or radio components to which or from which signals may be transmitted or received.

As previously described, the antenna(s) 730 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 730 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(s) 730 may be configured to transmit or receive radio frequency signals within any suitable frequency range forming part of the unlicensed portion of the radio spectrum.

The antenna(s) 730 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 712 may include any suitable radio component(s) for—in cooperation with the antenna(s) 730—transmitting or receiving radio frequency (RF) signals in the bandwidth and/or channels corresponding to the communications protocols utilized by the computer system(s) 700 to communicate with other devices. The transceiver(s) 712 may include hardware, software, and/or firmware for modulating, transmitting, or receiving—potentially in cooperation with any of antenna(s) 730—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 712 may further include hardware, firmware, or software for receiving GNSS signals. The transceiver(s) 712 may include any known receiver and baseband suitable for communicating via the communications protocols utilized by the computer system(s) 700. The transceiver(s) 712 may further include a low noise amplifier (LNA), additional signal amplifiers, an analog-to-digital (A/D) converter, one or more buffers, a digital baseband, or the like.

The sensor(s)/sensor interface(s) 710 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 714 may be configured to output light and/or render content. The optional speaker(s)/microphone(s) 716 may be any device configured to receive analog sound input or voice data.

It should be appreciated that the program module(s), applications, computer-executable instructions, code, or the like depicted in FIG. 7 as being stored in the data storage 720 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computer system(s) 700, and/or hosted on other computing device(s) accessible via one or more networks, may be provided to support functionality provided by the program module(s), applications, or computer-executable code depicted in FIG. 7 and/or additional or alternate functionality. Further, functionality may be modularized differently such that processing described as being supported collectively by the collection of program module(s) depicted in FIG. 7 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 7 may be implemented, at least partially, in hardware and/or firmware across any number of devices.

It should further be appreciated that the computer system(s) 700 may include alternate and/or additional hardware, software, or firmware components beyond those described or depicted without departing from the scope of the disclosure. More particularly, it should be appreciated that software, firmware, or hardware components depicted as forming part of the computer system(s) 700 are merely illustrative and that some components may not be present or additional components may be provided in various embodiments. While various illustrative program module(s) have been depicted and described as software module(s) stored in the data storage 720, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

One or more operations of the methods, process flows, and use cases of FIGS. 1-6C may be performed by a device having the illustrative configuration depicted in FIG. 7, or more specifically, by one or more engines, program module(s), applications, or the like executable on such a device. It should be appreciated, however, that such operations may be implemented in connection with numerous other device configurations.

The operations described and depicted in the illustrative methods and process flows of any of FIGS. 1-6C may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-6C may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. An autonomous mobile robot navigation system comprising:

a floor-mounted guide disposed on a floor of an environment, wherein the floor-mounted guide has a fiducial disposed at a center of the floor-mounted guide, and comprises a bright colored border surrounding the fiducial; and an autonomous mobile robot comprising a camera and a controller, the autonomous mobile robot configured to autonomously navigate in the environment, wherein the controller is configured to:

detect a first edge of the floor-mounted guide using the camera;

detect a second edge of the floor-mounted guide using the camera;

determine that a confidence interval associated with at least one of the first edge or the second edge is greater than a threshold;

determine a location of the autonomous mobile robot based at least in part on the first edge and the second edge;

determine a pose of the autonomous mobile robot based at least in part on the first edge and the second edge; and update a navigation path based at least in part on the location and the pose.

2. The autonomous mobile robot navigation system of claim 1, wherein the bright colored border has a first area that is at least ten times greater than a second area of the fiducial.

3. The autonomous mobile robot navigation system of claim 1, wherein the floor-mounted guide occupies at least 0.5% of a field of view of the camera at a distance of between 0.5 and 1.0 meters between the camera and the floor-mounted guide.

4. A system comprising:

a floor-mounted guide disposed on a floor of an environment; and an autonomous mobile robot comprising a camera and a controller, the autonomous mobile robot configured to autonomously navigate in the environment, wherein the controller is configured to:

detect a first edge of the floor-mounted guide using the camera;

detect a second edge of the floor-mounted guide using the camera;

determine that a confidence interval associated with at least one of the first edge or the second edge is greater than a threshold;

determine a pose of the autonomous mobile robot based at least in part on the first edge and the second edge; and update a navigation path based at least in part on the pose.

5. The system of claim 4, wherein the floor-mounted guide comprises a fiducial disposed at a center of the floor-mounted guide, and comprises a border surrounding the fiducial.

6. The system of claim 5, wherein the border has a first area that is at least ten times greater than a second area of the fiducial.

7. The system of claim 5, wherein the controller is further configured to:

detect the fiducial; and determine a location of the autonomous mobile robot based at least in part on the fiducial.

8. The system of claim 4, wherein the floor-mounted guide is at least one of: a single piece sticker assembly, or a painted floor feature.

9. The system of claim 4, wherein the camera is a first camera, and the autonomous mobile robot further comprises a second camera, and wherein the controller is further configured to:

determine that the autonomous mobile robot is on top of a center of the floor-mounted guide using the second camera.

10. The system of claim 4, wherein an angle between a camera plane along which the camera is oriented and a floor plane along which the floor-mounted guide is mounted is less than 45 degrees.

11. The system of claim 4, wherein the floor-mounted guide comprises an anti-glare coating, and wherein the camera is a front-facing camera.

12. The system of claim 4, wherein the floor-mounted guide occupies at least 0.5% of a field of view of the camera at a distance of between 0.5 and 1.0 meters between the camera and the floor-mounted guide.

13. A method comprising:

navigating, by an autonomous mobile robot, through an ambient environment from a first location to a second location;

detecting a first edge of a floor-mounted guide;

detecting a second edge of the floor-mounted guide;

determining that a confidence interval associated with at least one of the first edge or the second edge is greater than a threshold;

determining a pose of the autonomous mobile robot based at least in part on the first edge and the second edge; and updating a navigation path based at least in part on the pose.

14. The method of claim 13, further comprising:

determining that the autonomous mobile robot is within a predetermined distance of the second location prior to detecting the first edge of the floor-mounted guide.

15. The method of claim 13, wherein the floor-mounted guide comprises a fiducial disposed at a center of the floor-mounted guide, and comprises a border surrounding the fiducial.

16. The method of claim 15, further comprising:

detecting the fiducial; and determining a location of the autonomous mobile robot based at least in part on the fiducial.

17. The method of claim 15, wherein the border has a first area that is at least ten times greater than a second area of the fiducial.

* * * * *